(12) United States Patent
Lau

(10) Patent No.: US 8,591,329 B2
(45) Date of Patent: Nov. 26, 2013

(54) METHODS AND APPARATUSES FOR CONSTRUCTING INTERACTIVE VIDEO GAMES BY USE OF VIDEO CLIP

(75) Inventor: Michael Ping Cheung Lau, North Point (CN)

(73) Assignee: PC Concepts Limited, North Point (HK)

( * ) Notice: Subject to any disclaimer, the term of this patent is extended or adjusted under 35 U.S.C. 154(b) by 138 days.

(21) Appl. No.: 12/952,353

(22) Filed: Nov. 23, 2010

(65) Prior Publication Data

US 2011/0195779 A1  Aug. 11, 2011

(30) Foreign Application Priority Data

Feb. 5, 2010 (CN) .......................... 2010 1 0119673

(51) Int. Cl.
*G06F 17/00* (2006.01)
(52) U.S. Cl.
USPC ........................................................... 463/31
(58) Field of Classification Search
USPC ...................... 463/31–74, 1–5; 345/156, 629; 715/719; 700/87, 90–92
See application file for complete search history.

(56) References Cited

U.S. PATENT DOCUMENTS

| | | | | |
|---|---|---|---|---|
| 6,954,498 | B1 * | 10/2005 | Lipton | 375/240.08 |
| 7,048,632 | B2 * | 5/2006 | Kojima | 463/32 |
| 7,423,650 | B2 * | 9/2008 | Lee et al. | 345/473 |
| 2010/0013757 | A1 * | 1/2010 | Ogikubo | 345/156 |

* cited by examiner

*Primary Examiner* — Ronald Laneau
(74) *Attorney, Agent, or Firm* — Rabin & Berdo, P.C.

(57) ABSTRACT

The invention provides a method for processing a frame-recording based video clip without the need of modifying the video clip and/or directly inserting any form of signals into the video clip. The method comprises the steps of: browsing the video clip frame by frame by a video editing software; importing a grid layer into the video editing software such that the grid layer is browsed synchronously with each frame of the video clip; analyzing movement of a character and/or an object in the video clip by the grid layer; generating a series of game data to record the movement; storing the series of game data in a game unit after the generation of the game data; and connecting a game input to the game unit to activate the game, wherein the game unit receives input data from the game input when the video clip is played and synchronously compares the input data with the game data to determine whether they matches with each other. The invention also provides an apparatus for constructing an interactive video game by use of a frame-recording based video clip.

17 Claims, 18 Drawing Sheets

METHODS AND APPARATUSES FOR CONSTRUCTING INTERACTIVE VIDEO GAMES BY USE OF VIDEO CLIP

FIELD OF THE INVENTION

This invention relates generally to video data processing of a video clip, and more particularly to a method and an apparatus for constructing an interactive video game by use of a video clip.

BACKGROUND OF THE INVENTION

Video games are a popular entertainment in the modern households. There are many different types of electronic game devices available in the market, including plug and play, handheld LCD game, consoles and household entertainment systems such as X-Box and PlayStation. These video games devices may have different electronic designs but they share a same feature that, during the playing of the games, video images are typically generated in real time through sprite animation by their respective electronic game processors based on their respective digital video data and game control programs stored in their respective memories.

Wikipedia (en.wikipedia.org) states that, in computer graphics, a "sprite" is a two-dimensional image or animation that is integrated into a larger scene.

Sprites are originally invented as a method of quickly compositing several images together in two-dimensional video games using special hardware. As computer performance improved, this optimization became unnecessary and the term evolved to refer specifically to the two dimensional images themselves that are integrated into a scene. That is, figures generated by either custom hardware or by software alone are all referred to as sprites. As three-dimensional graphics became more prevalent, the term was used to describe a technique whereby flat images are seamlessly integrated into complicated three-dimensional scenes.

It is a general believe that video clips are not suitable for the making of interactive action games. In fact, there are some basic limitations and problems to use a video clip to construct an interactive video game.

1) A video clip is basically a pre-recorded movie, which may consist of real people and/or animals in a real scene or animated people and/or animals in a virtual scene, or a combination thereof. Because the video clip is a pre-recorded movie, it is very difficult, if not impossible, to directly make any instantaneous change to the contents in a particular frame in a real time application. This is because an interactive video game typically involves a series of real time actions and reactions between a game player and a game play, and the actions and reactions need to be shown in real time through a game unit.

2) In sprite animated video game design, the game designer and/or programmer must lay down the details for the game flow and game data before hand. Such game data may include: when a certain action is going to occur in the game, where on the video screen the animations will show up or move around, and what interactive movements or actions the animation need to perform. In other words, all the game actions and game flow data must be made available before a game program can be developed. But the video clip itself does not provide such information at all.

3) Assuming that in a simple sprite animation driving video game, the game player wants to steer his car from one lane to another lane on a road, which typically involves the use of an electronic game processor in the video game unit to read the steering wheel input from the game player. Then the game processor will process the steering input data according to a game control program and aesthetic and/or graphical data available in the game memory to create the scene of a car changing lane in virtually real time. To construct a similar video game using video clip, it is necessary to make at least 2 pre-recorded video clips because it is impossible to make any instantaneous change to the contents of the video clip as in the sprite animated video game. The first video clip is to show the car running on the original lane, and the second video clip is to show the car to change lane. When the game player steers the steering wheel, the game processor detects the steering input and then switches from playing the current video clip to playing the next video clip which shows the car to change lane. Since it takes a given time to switch from one video clip to another, this means there can be a delay in response time when it is necessary to switch from one video clip to another video clip.

4) In order to make the above steering action more realistic, it requires more than one steering angle and to collect other parameters such as a speed at which the car is running. If each steering angle and the running speed respectively require a separate video clip, this will need a large amount of video clips and will certainly become impractical, and the production cost will be increased dramatically.

The moving objects in a typical video game are made up of sprites that can move independently on the game scene background. In other words, the animations are generated in real time by the game processor using multi-layers of overlaying background images and sprite animations. In the video game design, sprites typically refer to characters and other moving objects in a game. The size of the sprite being animated in the game can have a significant impact on the processing speed at which a sprite is animated. Smaller sprite can be animated faster than larger sprites. This is because the game processor only needs to manipulate less graphic data with smaller sprites than with larger ones. Sprite size is typically defined in number of pixels, such as 16×16 pixels, 128×64 pixels and etc. Because the size of the sprite can impact the speed at which a sprite is animated, most video games employs relatively small sprites to avoid the needs of using a high speed game processor and a memory of large capacity in the electronic design which can significantly increase the costs of a product.

Due to this constrain in sprite size and speed in animation, the graphic quality and smoothness in motion animation are compromised for most of the video games. For example, dance game is a popular video game. There are various dance games available in the market. In the real world, a dance always involves different parts of a human body to move in a series of coordinated movements. Such complex movements are difficult to animate using sprites. Therefore most interactive video dance games in the market only employ geometric symbols, typically in the forms of directional arrows, such as Up, Down, Left and Right pointing arrows, in their interactive video scenes to represent the dance steps for the game player to follow instead of showing the actual dance steps by the dancer.

The technically advanced and expensive video gaming systems like X-Box and PlayStation also use directional arrows of sprite animations in their dance games to represent the dance steps. Although they display some high quality animated dancers in the dance games, the animated dancers do not dance in synchronization with the directional arrows or do not show the actual dance steps in the games.

On the other hand, the complex movements of the dancer in the real world can be captured in high fidelity in a video clip.

Alternatively, 3D computer model can be employed to animate the complex movements of a virtual dancer using computer softwares to produce some animated movies.

Because of the above constrains and problems, it has not been found in the art that a video clip is directly used to construct an interactive video game.

SUMMARY OF THE INVENTION

It is an objective of the present invention to provide a method for constructing various interactive video games using a frame-recording based video clip without the need of modifying the video clip and/or directly inserting any form of signals into the video clip.

It is another objective of the present invention to provide an apparatus for constructing various interactive video games using a frame-recording based video clip without the need of modifying the video clip and/or directly inserting any form of signals into the video clip.

In order to attain the above objectives, the present invention provides a method for processing a frame-recording based video clip, comprising the steps of:

browsing the video clip frame by frame by a video editing software;

importing a grid layer into the video editing software such that the grid layer is browsed synchronously with each frame of the video clip, wherein a character and/or an object in the video clip has a corresponding position in the grip layer, and the position of the character and/or the object varies with movement of the character and/or the object in the grid layer;

analyzing the movement of the character and/or the object by the grid layer in response to the variation of the position of the character and/or the object from successive frames of the video clip within the grid layer;

generating a series of data to record the movement of the character and/or the object; and storing the series of data.

The present invention further provides a method for constructing an interactive video game by use of a frame-recording based video clip, comprising the steps of:

browsing the video clip frame by frame by a video editing software;

importing a grid layer into the video editing software such that the grid layer is browsed synchronously with each frame of the video clip, wherein a character and/or an object in the video clip has a corresponding position in the grip layer, and the position of the character and/or the object varies with movement of the character and/or the object in the grid layer;

analyzing the movement of the character and/or the object by the grid layer in response to the variation of the position of the character and/or the object from successive frames of the video clip within the grid layer;

generating a series of game data to record the movement of the character and/or the object;

storing the series of game data in a memory of a game unit after the generation of all the game data; and connecting a game input to the game unit to activate the game, the game unit receiving input data from the game input when the video clip is played and synchronously comparing the input data with the game data to determine whether they matches with each other.

The present invention further provides a method for constructing an interactive video game by use of a video clip, comprising the steps of:

providing a grid pattern as a background during filming of the video clip;

browsing the video clip frame by frame by a video editing software after the filming, recording movement of a character and/or an object in the video clip within the grid pattern, and generating a series of game data;

storing the video clip and the series of game data in a memory of a game unit after the generation of all the game data; and connecting a game input to the game unit to activate the game, the game unit receiving input data from the game input when the video clip is played and synchronously comparing the input data with the game data to determine whether they match with each other.

According to the invention, the series of game data may be stored along with the video clip and a game control program in one memory and/or separate memories.

The present invention further provides an apparatus for processing a frame-recording based video clip, comprising:

a video editing module for browsing the video clip frame by frame;

input means connected to the video editing module for importing into the video editing module a grid layer which is browsed synchronously with each frame of the video clip, wherein a character and/or an object in the video clip has a corresponding position in the grip layer, and the position of the character and/or the object varies with movement of the character and/or the object within the grid layer;

editing means connected to the video editing module for generating a series of data in response to the movement of the character and/or the object from successive frames of the video clip within the grid layer to record and analyze the movement by the grid layer; and a memory connected to the editing means for storing the series of data.

The present invention further provides an apparatus for constructing an interactive video game by use of a frame-recording based video clip, comprising:

a video editing module for browsing the video clip frame by frame;

input means connected to the video editing module for importing into the video editing module a grid layer which is browsed synchronously with each frame of the video clip, wherein a character and/or an object in the video clip has a corresponding position in the grip layer, and the position of the character and/or the object varies with movement of the character and/or the object within the grid layer;

editing means connected to the video editing module for generating a series of game data in response to the movement of the character and/or the object from successive frames of the video clip within the grid layer to record and analyze the movement by the grid layer;

a memory connected to the editing means for storing the series of game data;

a game input for inputting data indicative of operational movement of a game player; and a game unit connected respectively to the memory and the game input for receiving input data from the game input when the video clip is played and synchronously comparing the input data with the game data to determine whether they match with each other after the game is activated.

The game input may be a dance mat, and the game unit compares the input data from the dance mat with the game data to determine whether the game player follows correctly steps of the character in the video clip, and then provide a feedback.

The game unit may further provide a score layer to show a score indicative of how well the game player follow correctly the steps of the character in the video clip.

The present invention further provides an apparatus for constructing an interactive video game by use of a video clip utilizing a grid pattern as a background during filming of the video clip, comprising:

editing means for generating a series of game data in response to movement of a character and/or an object in the video clip within the grid layer record the movement by the grid layer;

a memory connected to the editing means for storing the series of game data in a game unit after the generation of all the game data;

a game input for inputting data indicative of operational movement of a game player; and wherein the game unit is connected respectively to the memory and the game input for receiving input data from the game input when the video clip is played and synchronously comparing the input data with the game data to determine whether they match with each other after the game is activated.

According to the invention, a frame-recording based video clip may be used to construct an interactive video game without the need of modifying the video clip and/or directly inserting any form of signals into the video clip, enabling the significant improvement in the video quality at a very low cost. The invention provides an alternative solution of interactive video game design.

To have a better understanding of the invention reference is made to the following detailed description of the invention and embodiments thereof in conjunction with the accompanying drawings.

DETAILED DESCRIPTION OF THE PREFERRED EMBODIMENTS

Figure 1:
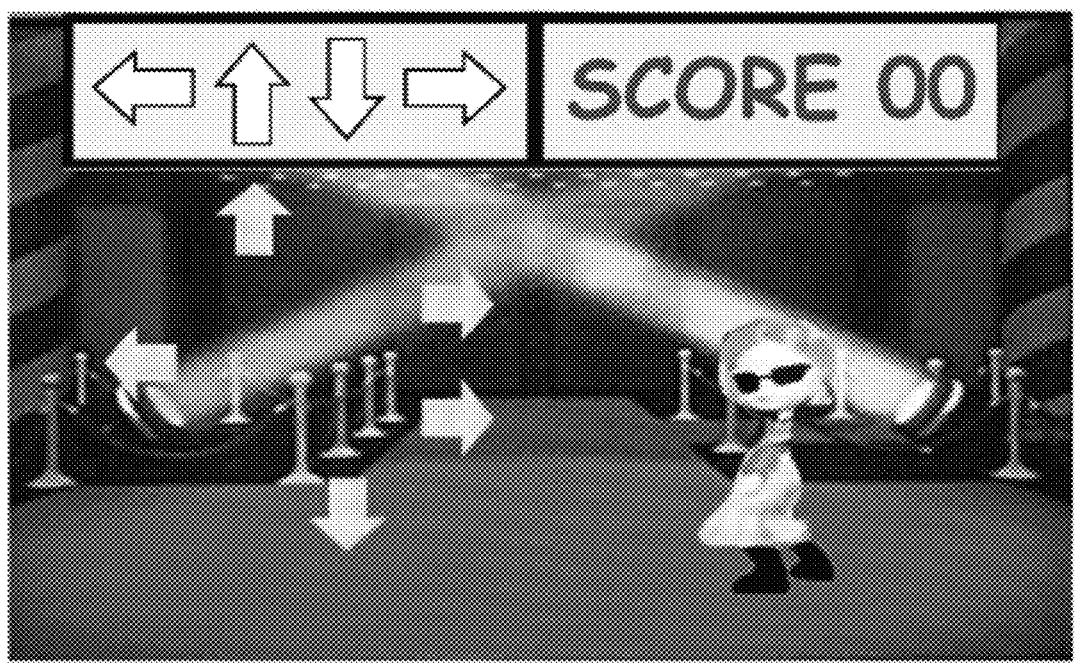
FIG. 1 illustrates a typical game scene generated in real time using overlaying background layer and multiple sprite animated layers by a game processor in a game unit.
Figure 2:
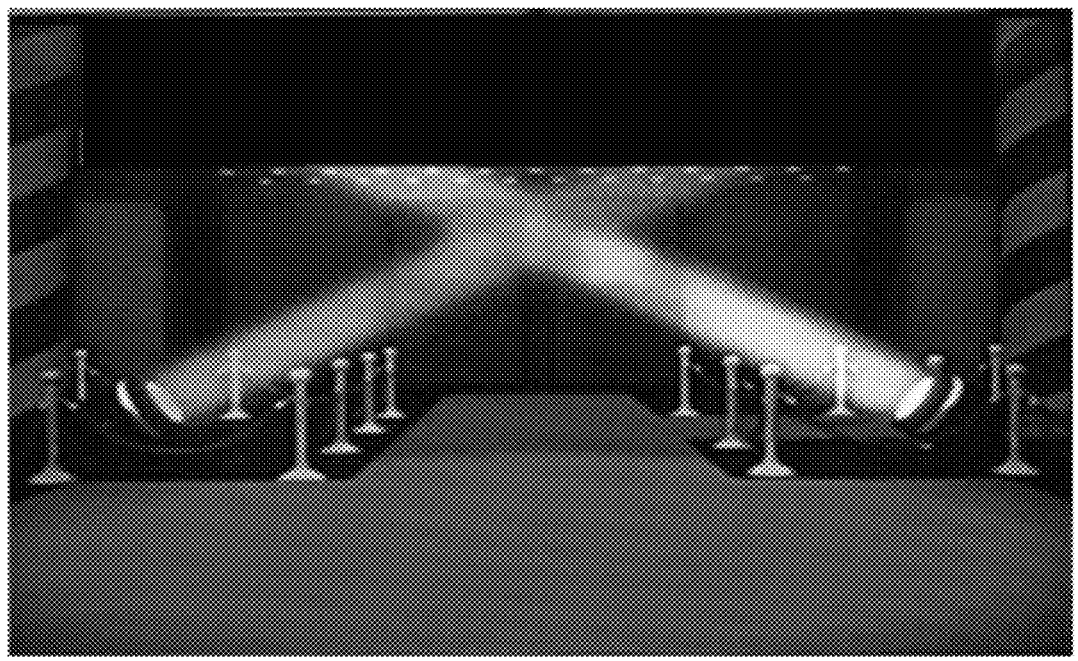
FIG. 2 illustrates a background layer.
Figure 3:
FIG. 3 illustrates a sprite animated layer containing a dancer.
Figure 4:
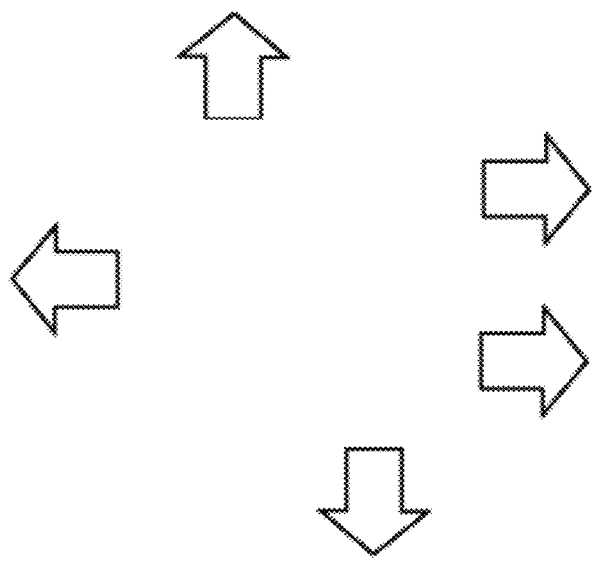
FIG. 4 illustrates a sprite animated layer containing directional arrows.
Figure 5:
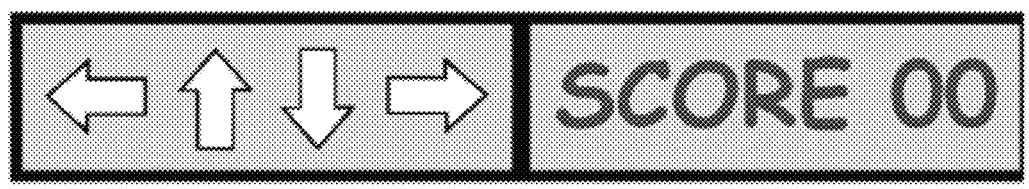
FIG. 5 illustrates a sprite animated layer containing a dance step action box and a score.

FIG. 1 shows a typical screen of a video dance game constructed by sprite animation. The purpose of such a game is to allow one or more game players to follow the dance steps shown on the screen such as a TV. As shown in FIG. 1, this game typically uses sprites to generate some directional arrows to show the game player what foot step to move to synchronize with the arrows as the arrows scroll upward and change their color, for example from green to red, when the arrows reaches the action box located on the upper left hand side on the screen. The game scene as shown in FIG. 1 is generated in real time using a multiple of overlaying background layer and sprite animation layers by a game processor in a game unit. The multiple of layers typically include a background layer as shown in FIG. 2, a sprite animated layer for the animated dancer as shown in FIG. 3, a sprite animated layer for the directional arrows as shown in FIG. 4, and a sprite animated layer of the dance step action box and the score as shown in FIG. 5. In order to generate these different layers of animation using sprites, the game designer and/or programmer must lay down the details for the game flow and game actions, including but not limited to when certain action is going to occur in the game, where on the video screen the animations will show up or move around, and what movements or actions the animation need to perform. In other words, all the game actions and game flow data must be made available before a game program can be developed.

Figure 6A:
FIGS. 6a and 6b illustrate a typical dance mat which is electrically connected and wirelessly connected, respectively.
Figure 6B:
Figure 7:
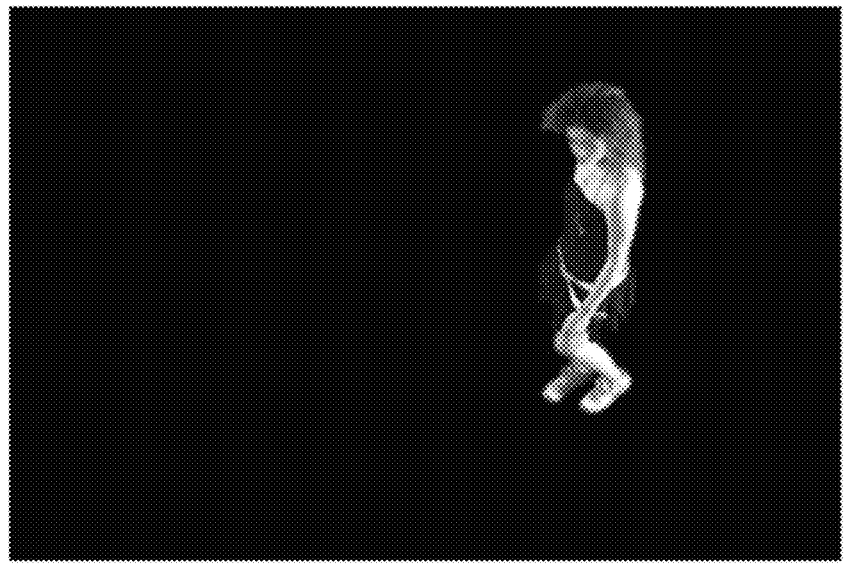
FIGS. 7 to 12 illustrate six individual frames captured from a video clip of a dancing young lady.
Figure 8:
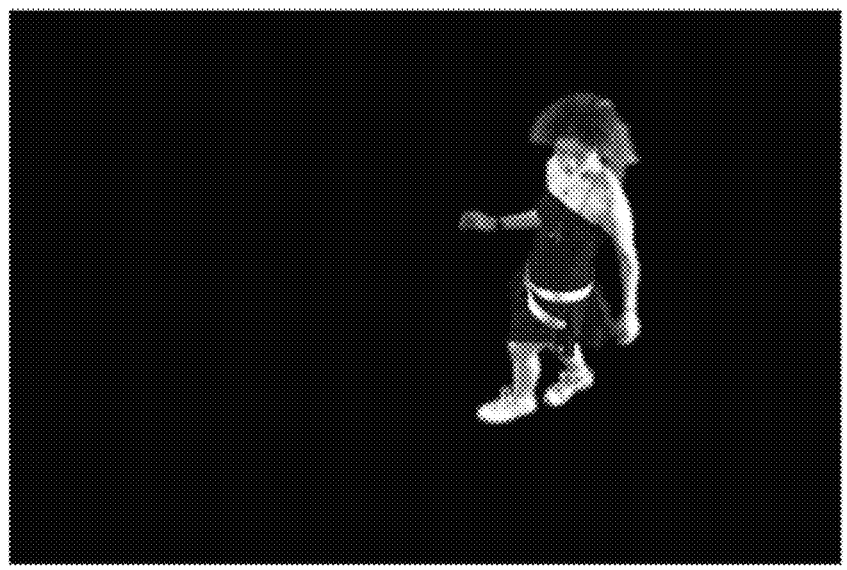
Figure 9:
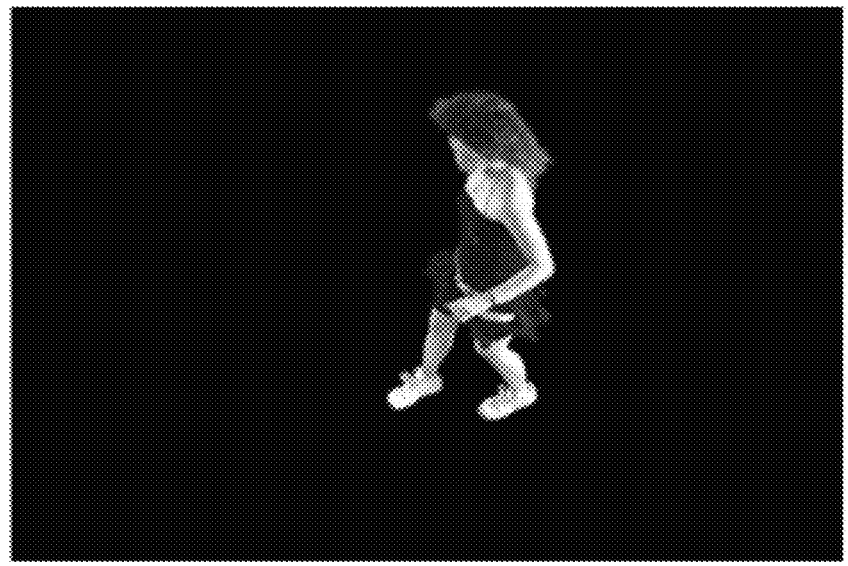
Figure 10:
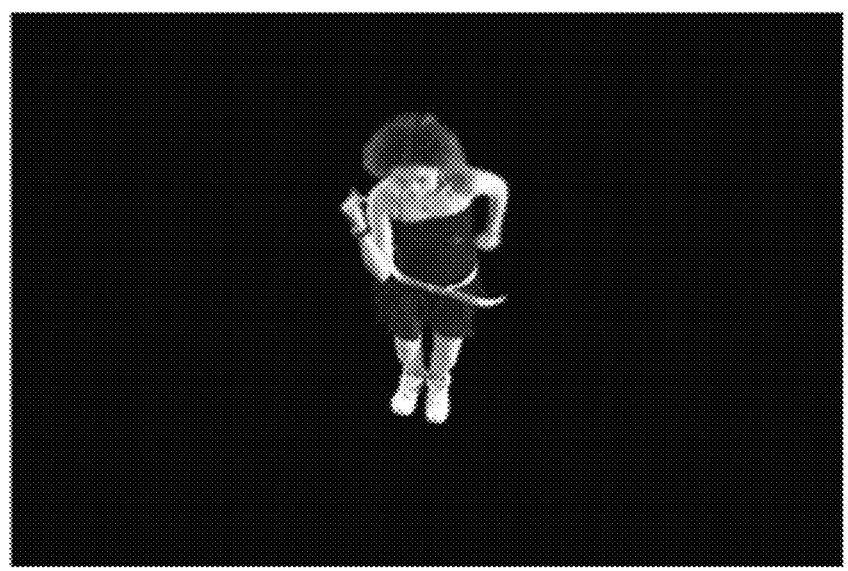
Figure 11:
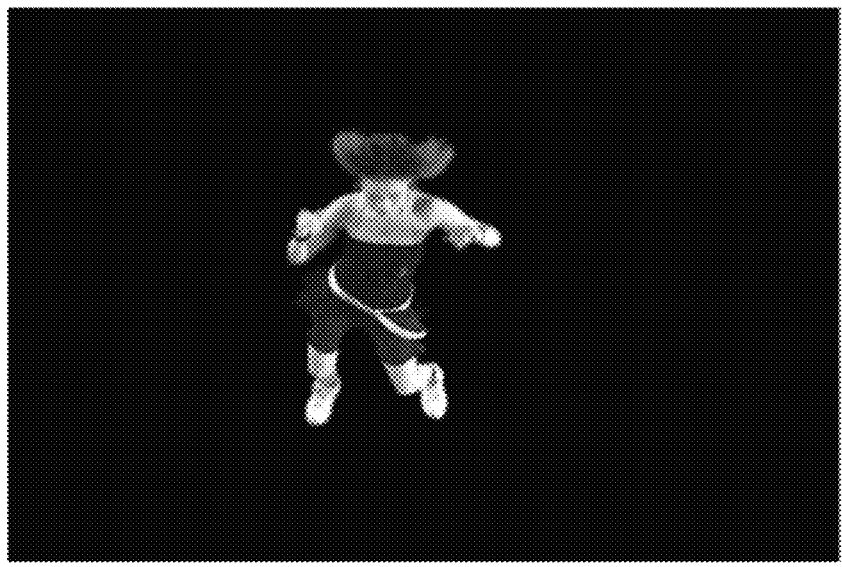
Figure 12:
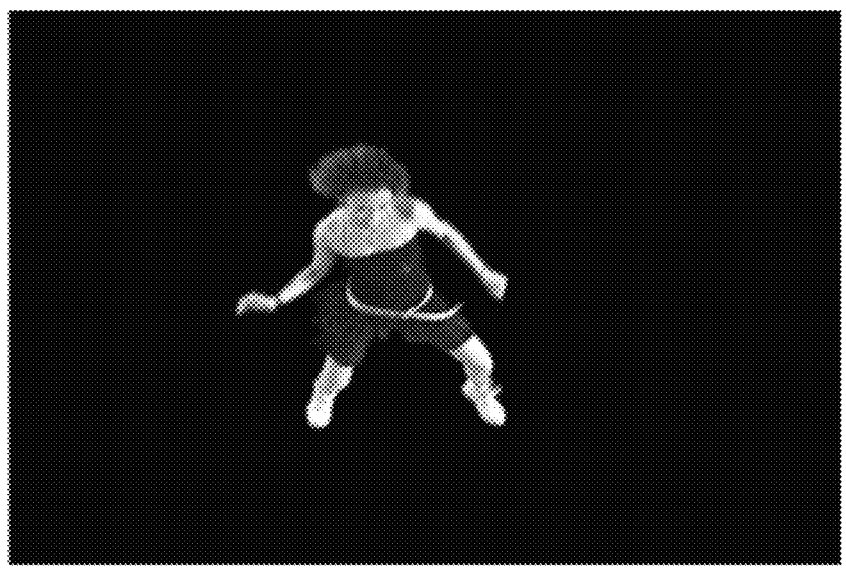

Typically, a dance mat is used as an user interface for such a dance game, which generally has 9 squares in a 3×3 matrix with pointing arrows imprinted to represent the respective directional arrows that appear in the game. In this illustration, as the "up" pointing arrow reaches the action box and changes color from green to red, the game player needs to follow the move by stepping onto the corresponding "up" pointing arrow on the dance mat within a certain time slot. FIG. 6a shows a typical dance mat, which is electrically connected to the game unit via wire connection. FIG. 6b illustrates a dance mat connected to the game unit via wireless connection, such as RF or IR connection.

Each square on the mat is a normally "off" switch. When the game player sets a foot onto a square on the mat, the body weight of the game player enables the closure of the particular switch underneath the square.

The game processor of the game unit detects the "on" state of the switch and compares inputs from the dance mat to a signal of the arrow representing the current dance step in the game to determine if the game player is able to follow and synchronize with the dance step in the form of directional arrows as shown on the screen.

The above typical method employing multilayers of sprite animation to generate the animated scene in an interactive dance game is an effective game design, but it is a compromised design because it fails to show the realism of the harmonized, complex and beautiful movements of the dancer.

The following is to explain a method which uses a video clip to construct interactive video games without the need of any modification made to the video clip or without the need of direct insertion of any kinds of signal into the video clip. A dance game is used to explain the basic principle of the invention. Every dance has some unique dance steps to match the musical beat and tempo of a piece of music or song. For example, the dance steps of a Cha Cha dance is different from that of a Tangle dance.

FIGS. 7 to 12 show 6 individual frames captured from a video clip of a dancing young lady using a video editing software. As shown, each of the frames captures her complex dance movements as she dances to the music. While each frame in the video clip is able to capture the dancing young lady's movements in great detail, the video clip does not spontaneously provide any data on the dance step nor provides interactive game play for a game application. So even such a video clip is programmed into a game unit with an electrically connected dance mat for the game player to mimic the dance steps of the lady in the video clip, there will not be any interactivity between the video clip and the game player. In the absence of the data on the dance steps, the game processor is unable to determine if the game player follows the dance steps correctly or not.

Therefore, it is necessary to determine the dancer's dance steps and their respective time slots in the video clip before the dance video clip can be used to construct an interactive video game. For this reason, a game control program needs to be developed for the game processor of the game unit to keep track of and compare the inputs from the dance mat to the dance step-based data to decide if the game player is able to correctly follow the dance steps within their respective time slots or not.

When the video clip is displayed on a display screen such as a LCD display, the images are displayed on a 2 dimensional screen. Therefore the position of an object displayed on the screen can basically be located using an X-Y coordinate method.

Figure 13:
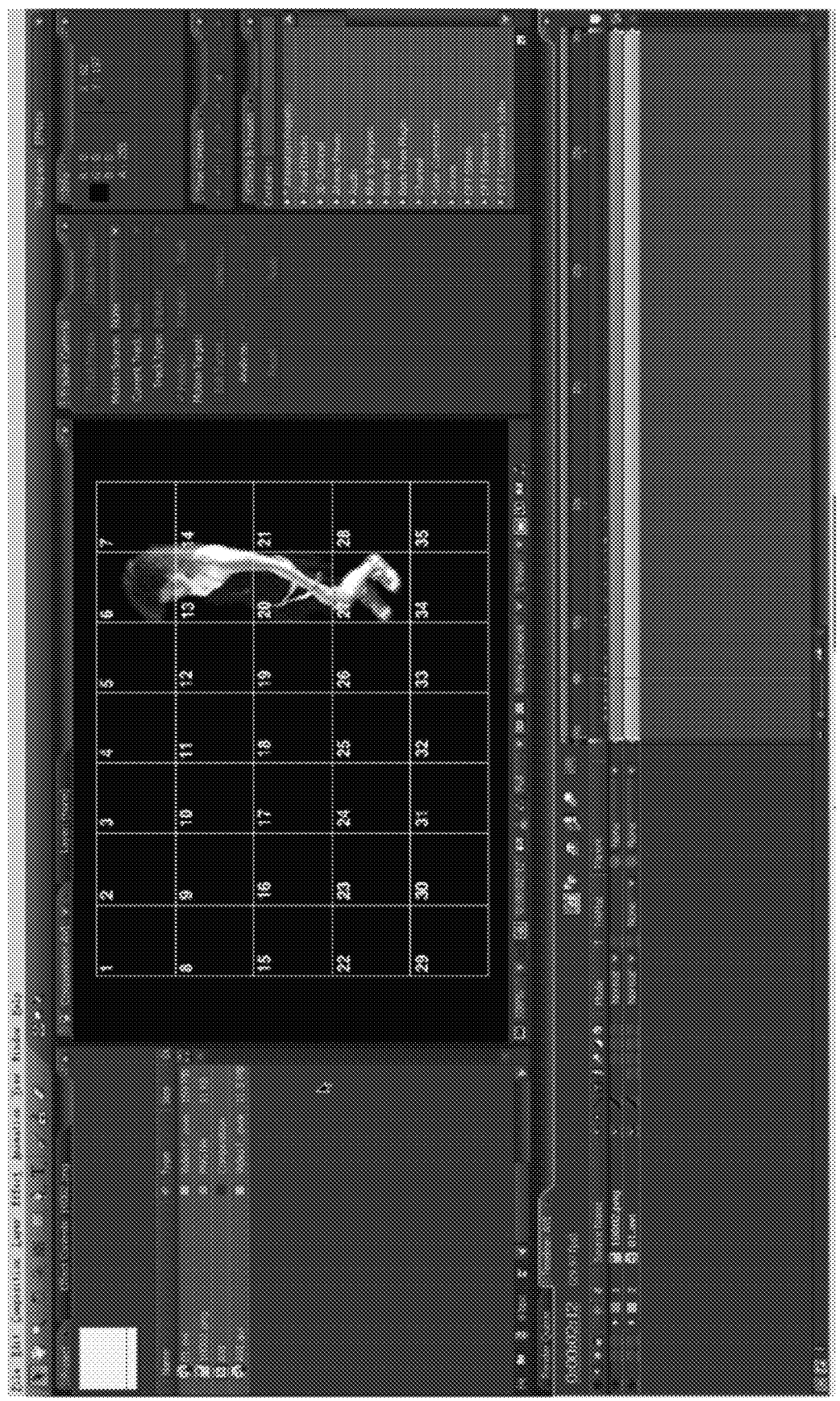
FIG. 13 illustrates the dancer getting ready for the music to start.
Figure 24:
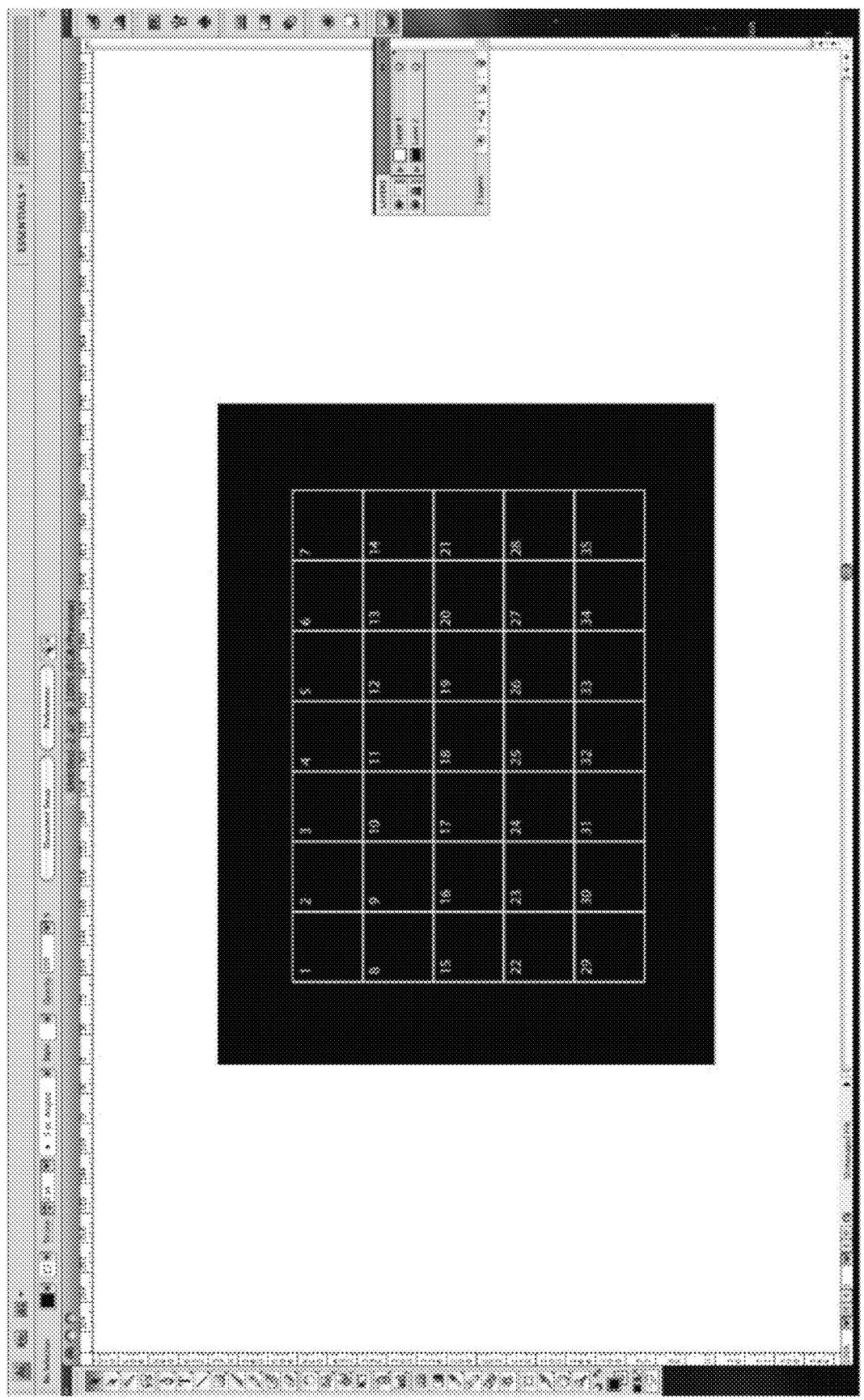
FIG. 24 illustrates a grid layer.

There are many video editing softwares available in the market, which can be used to browse through a video clip frame by frame and provide a variety of editing tools to facilitate the editing of the video clip. However, these editing softwares themselves are unable to automatically generate any game information for use in a game, even though the video editing softwares can provide the editing tools to browse through a video clip frame by frame. The video editing softwares typically support multiple video layers. By making use of the characteristic of displaying multiple video layers, a grid layer can be imported and displayed simultaneously with a video clip, as shown in FIG. 13. The grid layer is made transparent except for the dividing grid lines, such that the video clip is visible in the presence of the grid layer. FIG. 24 illustrates a single grid layer, wherein each grid of the grid layer is assigned with a reference number for the convenience of collecting the game data from the video clip.

Figure 14:
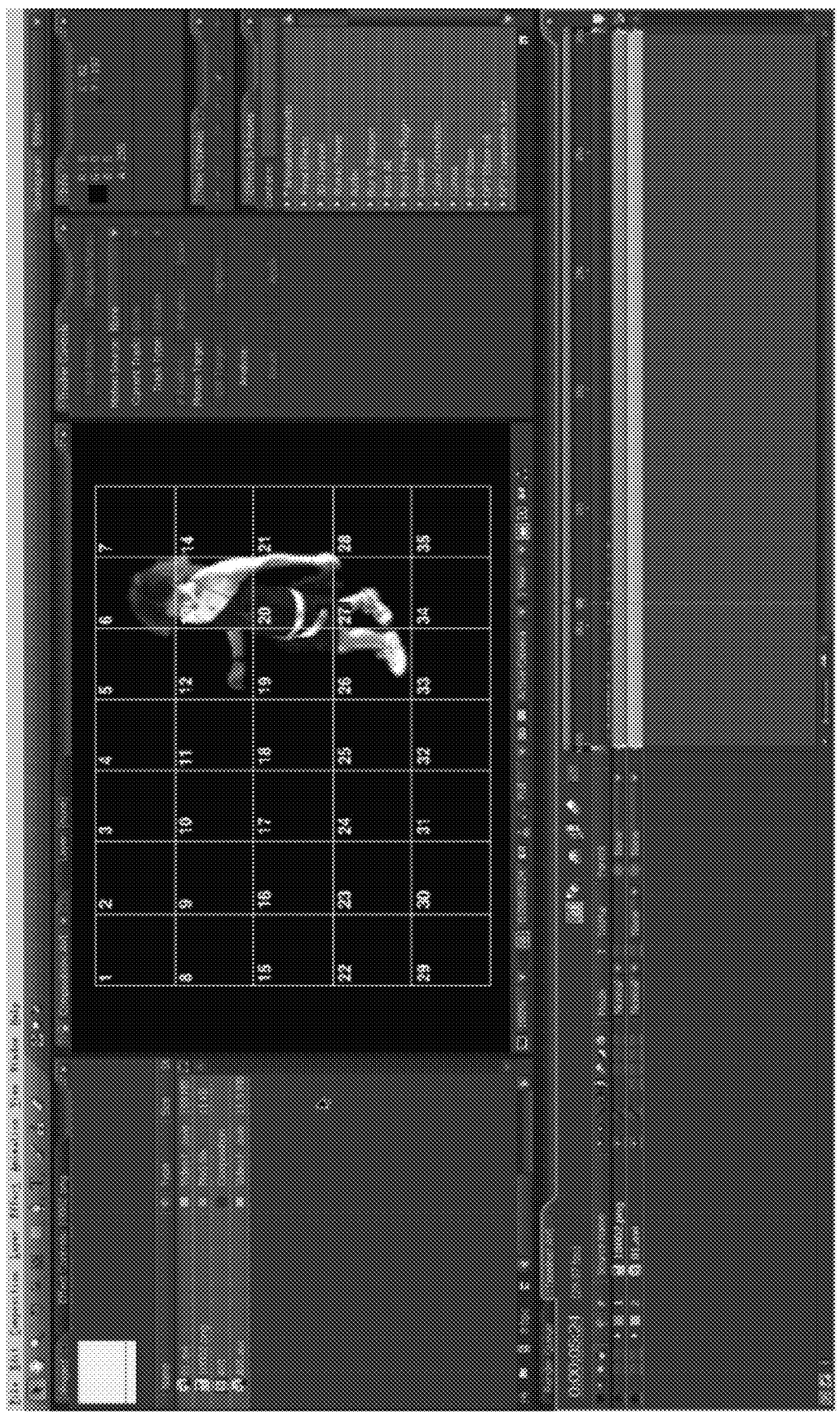
FIG. 14 illustrates the dancer's first move of the dance to the music.

After the dance video clip and the transparent grid layer are imported into the video editing software, it is then possible to browse through the video clip frame by frame. For example, FIG. 13 shows the dancer getting ready for the music to start. FIG. 14 shows the first move of the dancer as she begins to dance to the music. As shown in FIGS. 13 and 14, the grid layer helps to reveal the relative positions of the dancer's dance steps and her moves as the video clip is displayed on the editing screen. FIG. 13 shows that the dancer is getting ready in grid 27, and FIG. 14 shows that the first dance step is in grid no. 26. By advancing the video clip frame by frame, the dance steps of the dancer and their respective time slots can be obtained. This information is then made into a table for example manually as shown below. The time slot between the "on" state and the "off" state of a dance step herein refer to a duration during which time the dance step remains in a particular position.

TABLE game data on dance steps in the first 30 seconds

| Dance step | Grid No. | Right Foot | Left Foot | Dance step on | Dance step off |
|---|---|---|---|---|---|
| 1 | 26 | * | | 4.09 | 6.08 |
| 2 | 25 | | * | 5.12 | 8.19 |
| 3 | 25 | * | | 6.18 | 9.08 |
| 4 | 24 | | * | 8.28 | 13.1 |
| 5 | 26 | * | | 9.15 | 12.05 |
| 6 | 25 | * | | 12.17 | 14.2 |
| 7 | 31 | | * | 13.23 | 14.02 |
| 8 | 25 | | * | 14.12 | 15.24 |
| 9 | 33 | * | | 15.01 | 15.08 |
| 10 | 25 | * | | 15.18 | 16.29 |
| 11 | 31 | | * | 16.06 | 16.13 |
| 12 | 25 | | * | 16.23 | 18.1 |
| 13 | 33 | * | | 17.12 | 17.19 |
| 14 | 25 | * | | 17.29 | 21.04 |
| 15 | 24 | | * | 18.20 | 20.20 |
| 16 | 25 | | * | 20.28 | 23.00 |
| 17 | 18 | * | | 21.15 | 21.23 |
| 18 | 26 | * | | 22.06 | 22.14 |
| 19 | 25 | * | | 22.23 | 24.02 |
| 20 | 24 | | * | 23.10 | 23.20 |
| 21 | 25 | | * | 23.28 | 25.10 |
| 22 | 19 | * | | 24.15 | 24.24 |
| 23 | 25 | * | | 25.05 | |
| 24 | 31 | | * | 25.24 | 26.01 |
| 25 | 25 | | * | 26.09 | 26.17 |
| 26 | 17 | | * | 26.28 | 27.11 |
| 27 | | | | | |
| 28 | 25 | | * | 27.17 | 27.24 |
| 29 | 31 | | * | 28.05 | 31.18 |
| 30 | 25 | | * | 31.28 | |

All the game data is stored after they are obtained. In addition, the dance video clip, the game data and the game program are programmed into the game processor of the game unit. When a dance mat is connected to the game unit and a game is started, the video player in the game unit plays the video clip stored in a memory of the game unit, and the game program stored in the memory instructs the game unit to simultaneously check the inputs from the dance mat when the game player mimics the dance steps in the video clip by dancing on the dance mat. The game processor then compares the inputs from the dance mat to the stored game data to determine if the game player is able to follow the dance steps correctly or not. To be simple, the game unit can simply be programmed to provide some audio feedbacks, for example, to use different tones to interact with the game player to indicate that the move of the game player is correct and/or incorrect.

Figure 15:
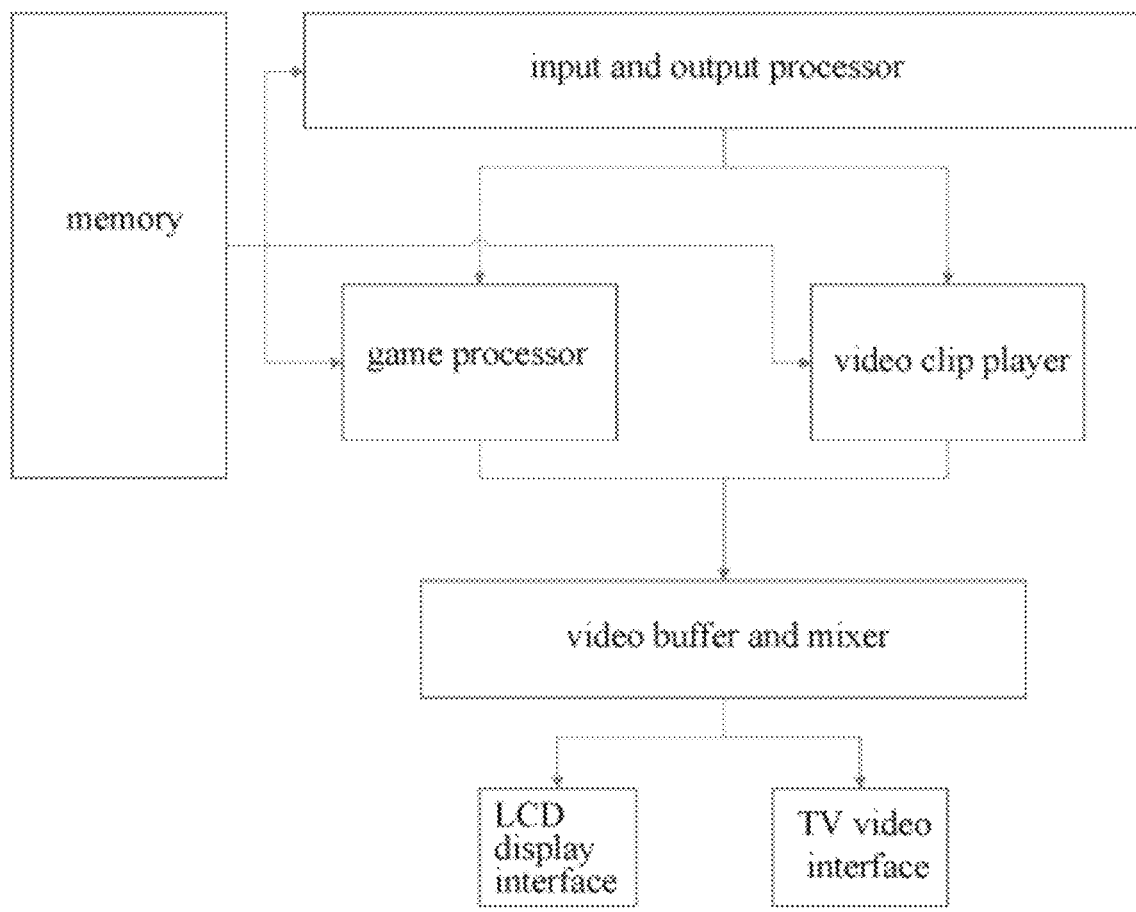
FIG. 15 illustrates a block diagram of a game unit adapted for the present invention.

FIG. 15 illustrates a functional block diagram of a preferred game unit design adapted for the present invention. The game unit comprises a memory for storing the dance video clip, the game data and the game program; an input and output processor connected with an input of the game unit for gathering input signals of the game player; and a game processor for processing the game data and the input signals of the game player and comparing the input signals of the game player with the game data to determine if the game player is able to follow the game correctly or not. To be simple, the game processor of the game unit can simply be programmed to provide some audio feedbacks, for example to use different tones to interact with the game player. The game unit further comprises a video clip player for obtaining the video clips from the memory; a video buffer and mixer for receiving the video clips sent by the video clip player and the processed input signals and the game data from the game processor, and the video clips and the processed input signals and the game data being allowed to be transmitted simultaneously or individually; and a display connected with the video buffer and mixer via a proper display interface. The display interface may be a LCD output interface, a TV video interface, or the like. The game player could see the video clips on the display and get simultaneously the message provided by the game processor. This enhances the amusement of the game.

Thus, the invention provides a method for processing a frame-recording based video clip, comprising the steps of: browsing the video clip frame by frame by a video editing software; importing a grid layer into the video editing software such that the grid layer is browsed synchronously with each frame of the video clip, wherein a character in the video clip has a corresponding position in the grip layer, and the position of the character varies with movement of the character in the grid layer; analyzing the movement of the character by the grid layer in response to the variation of the position of the character from successive frames of the video clip within the grid layer; generating a series of data to record the movement of the character; and storing the series of data.

The grid layer is preferably transparent, and divided into a plurality of grids by a plurality of grid lines, each of the grids being assigned with a reference number. The movement of the character includes a position or a relative position of the character in the successive frames, a direction of the movement of the character or a direction of the movement of footstep of the character in the successive frames.

The invention further provides a method for constructing an interactive video game by use of a frame-recording based video clip, comprising the steps of: browsing the video clip frame by frame by a video editing software; importing a grid layer into the video editing software such that the grid layer is browsed synchronously with each frame of the video clip, wherein a character in the video clip has a corresponding position in the grip layer, and the position of the character varies with movement of the character within the grid layer; analyzing the movement of the character by the grid layer in response to the variation of the position of the character from successive frames of the video clip in the grid layer; generating a series of game data to record the movement of the character; storing the series of game data in a memory of a game unit after the generation of all the game data; and connecting a game input to the game unit to activate the game, the game unit receiving input data from the game input when the video clip is played and synchronously comparing the input data with the game data to determine whether they matches with each other.

The grid layer is preferably transparent and is divided into a plurality of grids by a plurality of opaque grid lines, each grid being assigned with a reference number. The grid lines may be spaced evenly or variably.

The movement of the character includes a position or a relative position of the character in the successive frames, a direction of the movement of the character or a direction of the movement of a footstep of the character in the successive frames.

The game input is a dance mat, and the game unit compares the input data from the dance mat with the game data to determine whether a game player on the dance mat follows dance steps of the character in the video clip correctly or not, and then provide a feedback. Preferably, the game unit further provides a score layer to show a score indicative of how well the game player follow correctly the steps of the character in the video clip.

The game input may be any type of input device known in the art.

Figure 16:
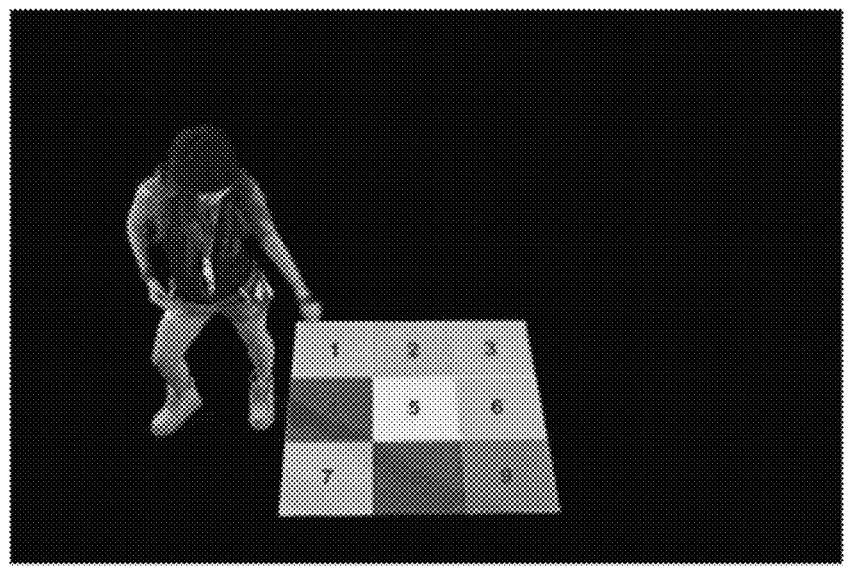
FIGS. 16, 17 and 18 illustrate color grids used during the filming of the dance video clip, respectively.
Figure 17:
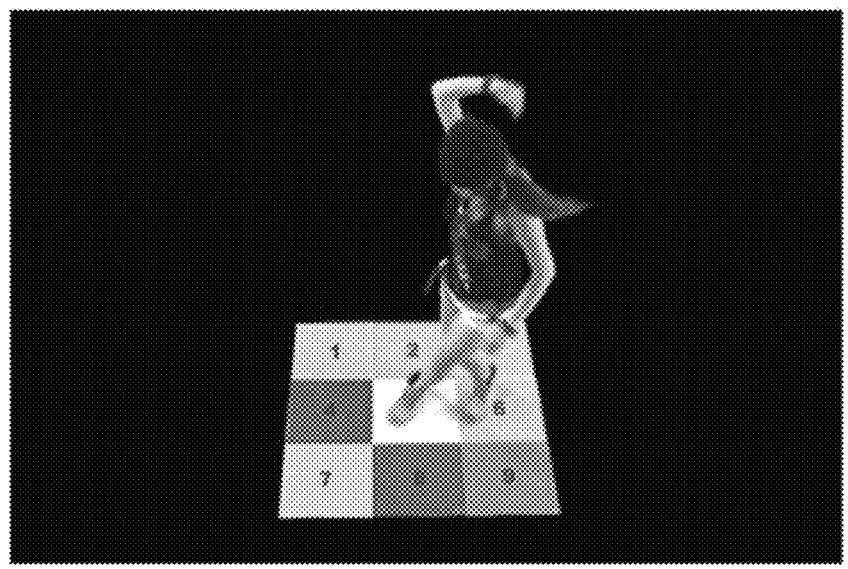
Figure 18:
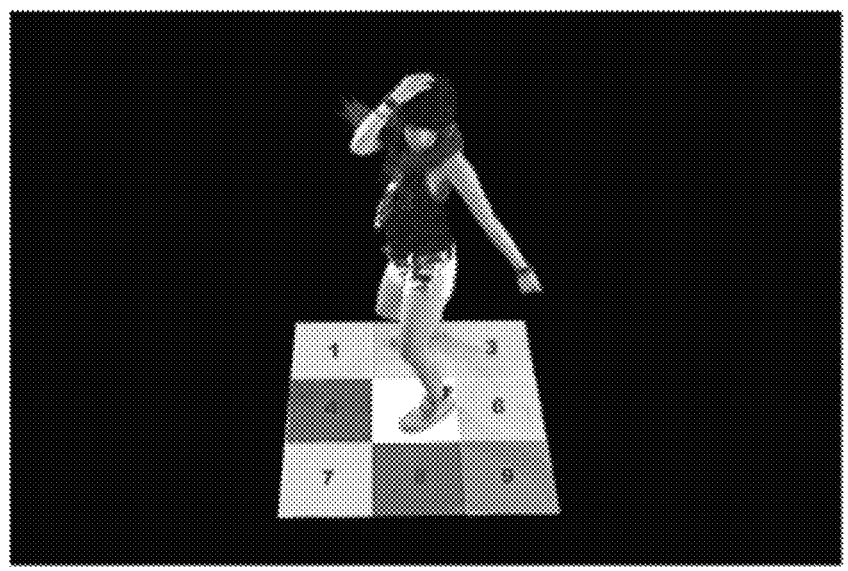

As discussed above, the video clip is able to show the dance steps of the dancer and can be used to construct an interactive dance game, however, it is not easy for the game player to watch the video clip and mimic the dance steps at the same time, especially for the beginners, when the musical tempo in the dance video clip is fast and the dance steps are fast and complex. Advantageously, a grid pattern or a dance mat similar to the layout of the dance mat actually used by the game player in the game is included during filming of the video clip such that visually the dancer in the video clip dances on the same color grids, which provides the ease and simplicity of following the dance steps. Apart from the different colors, the color grids used for the filming of the dance video clip may have different grid numbers or different symbols already imprinted thereon, as can be seen in FIGS. 16, 17 and 18 respectively. In this way, not only the color grids in the video clip help to visually define and communicate the dance steps to the game player in the game, but also the creation of the game data from the video clip is simplified as each of the grids in the video clip can be immediately identified by their respective grid numbers when the video clip is browsed through frame by frame using the video editing software. Moreover, as the grids and the grid numbers already exist in the video clip, there is no need to employ a separate transparent grid layer during the extraction of the game data using the video editing software.

Figure 19A:
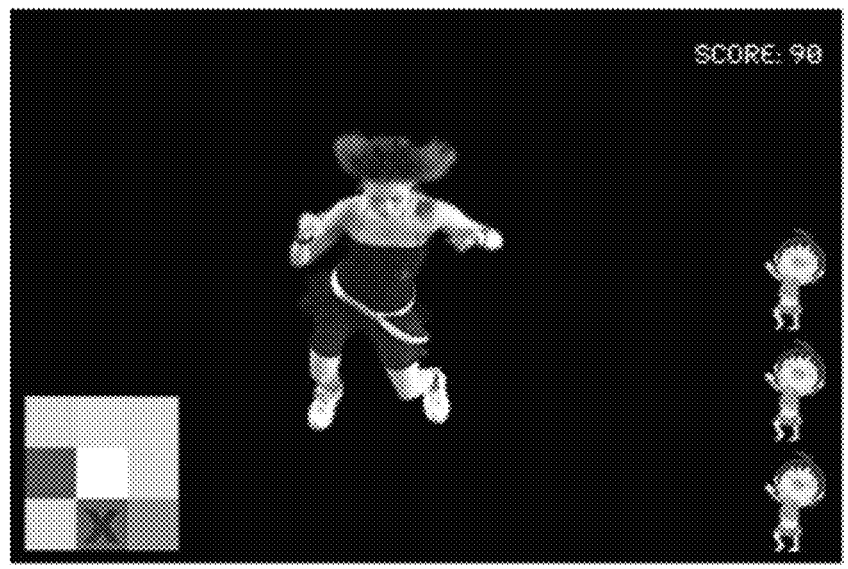
FIG. 19 illustrates a blinking cross (X) created using sprite animation.
Figure 19B:
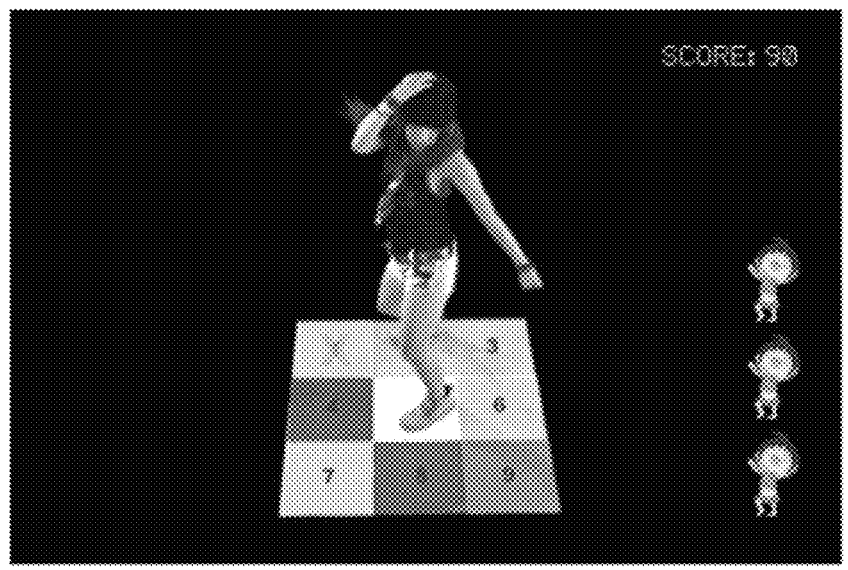

Since a lot of the available processors are capable of displaying a multilayer video with sprite animation, this would further enhance the game play of the video clip dance game. As shown in FIG. 5, one example of enhancing the game play is to include a sprite animated score layer to show how well the game player is performing in the game, apart from using different tones to provide audio interactive feedbacks in the game. In addition, instantaneous visual effect such as a blinking cross (X) can be created using sprite animation to show an incorrect move in the dance step by the game player to enhance the interactivity of the game, as shown in FIG. 19. The inclusion of any sprite animated layers described above is only to enhance the play features in the video clip game, but does not actually bring any physical modification to the video clip itself. Alternatively, an interactive video clip game can be constructed without the inclusion of the sprite animated layers.

Thus, the invention also provides a method for constructing an interactive video game by use of a video clip, comprising the steps of: providing a grid pattern as a background during filming of the video clip; recording movement of a character in the video clip within the grid pattern, and generating a series of game data; storing the video clip and the series of game data in a memory of a game unit after the generation of all the game data; and connecting a game input to the game unit, and after the game is activated the game unit receiving input data from the game input when the video clip is played and synchronously comparing the input data with the game data to determine whether they match with each other.

Figure 20:
FIGS. 20 and 21 illustrate two frames captured from a police drama movie, respectively.
Figure 21:
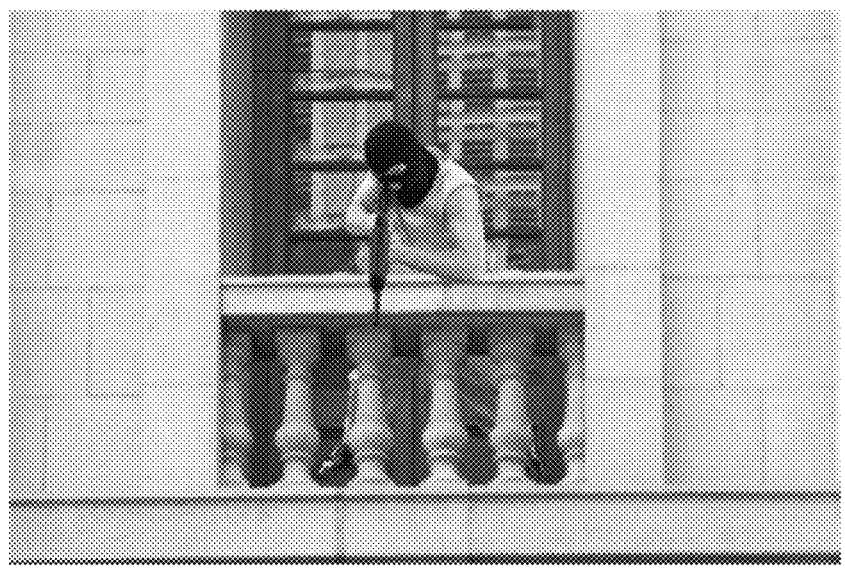

Different types of interactive video clip games can be constructed using a video editing software and an overlay of a grid layer to generate game data from a video clip. Another example of the interactive video clip game is an interactive shooting game constructed from a police drama movie. FIGS. 20 and 21 are 2 frames captured from a police drama movie, in which some gangsters get hold of a hostage on their run after robbing a bank. The game play can be designed to shot down the gangsters to score and save the hostage. Therefore the interactive game data to be established and extracted from such a video clip includes: 1) the position of each of the characters at which he or she appears on the screen; 2) the time frame at which the characters appear on the screen; and 3) the duration of time for which they appear on the screen.

Figure 22:
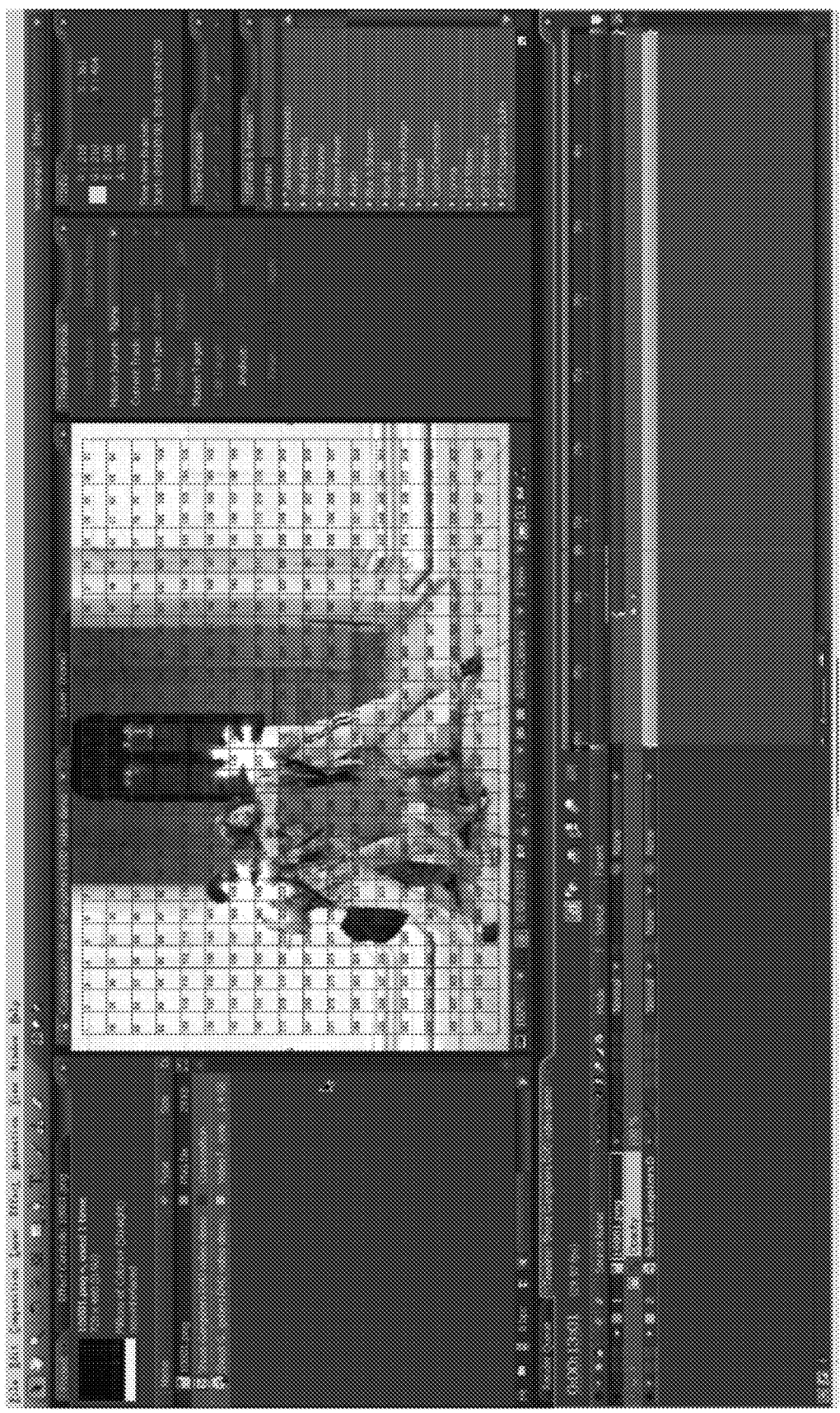
FIGS. 22 and 23 illustrate an editing window showing simultaneously an image of the police drama movie and a grid layer which are overlaying, respectively.
Figure 23:
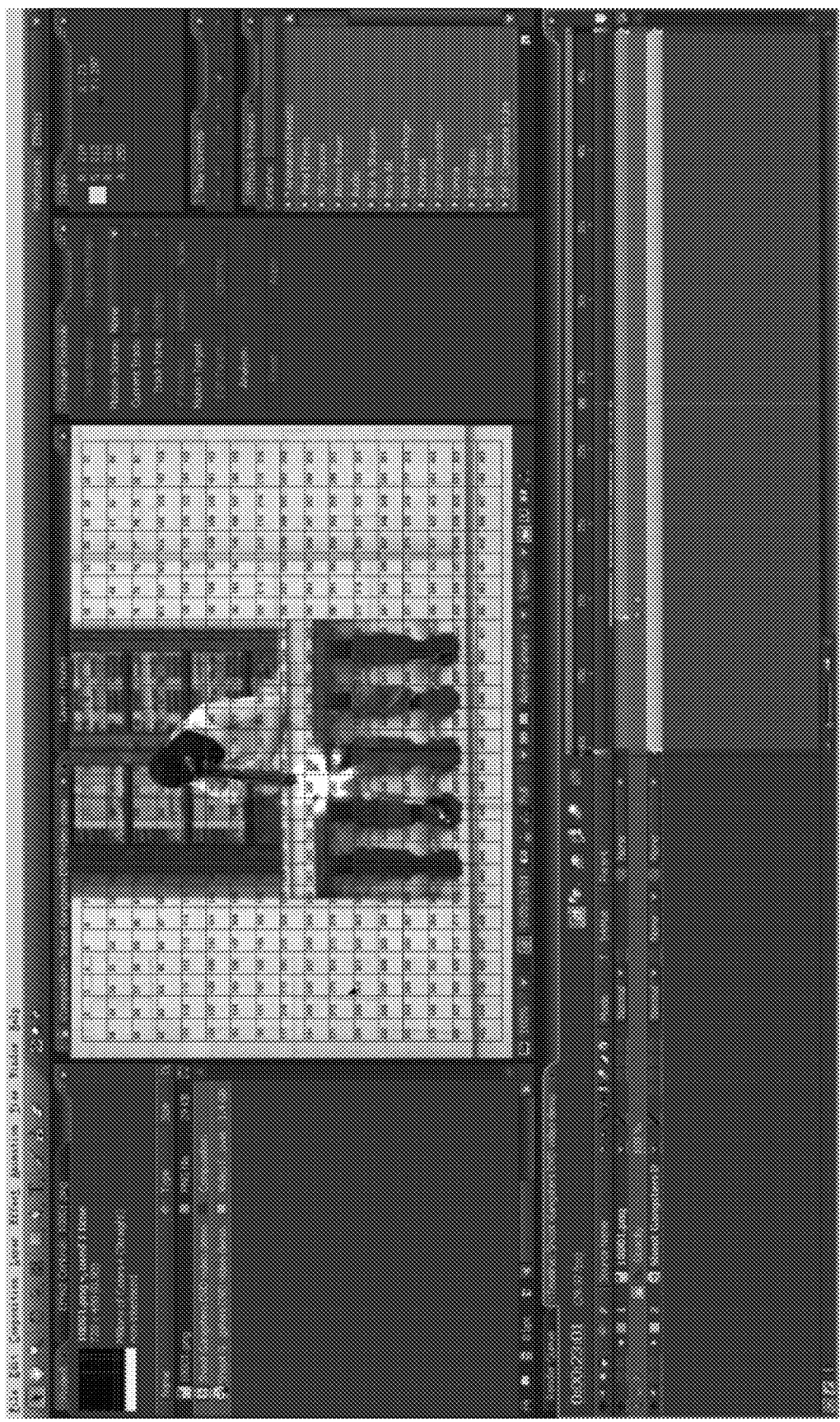

As explained before, browsing through the movie frames using a video editing software and a transparent grid overlay layer enables to generate the game data. FIGS. 22 and 23 show an editing window with the police drama video clip and the overlay grid layer displayed simultaneously. As shown in these figures, the screen of the police drama video clip is now clearly divided into a number of grids each having a reference number. With the aid of the video editing software, it is possible to browse through the video clip frame by frame to locate the game data for the hostage and the gangsters respectively.

Figure 25:
FIG. 25 illustrates a shooting sight which is created by sprite animation and is overlaying the video clip to allow a game player to chase and aim at the target.
Figure 26:
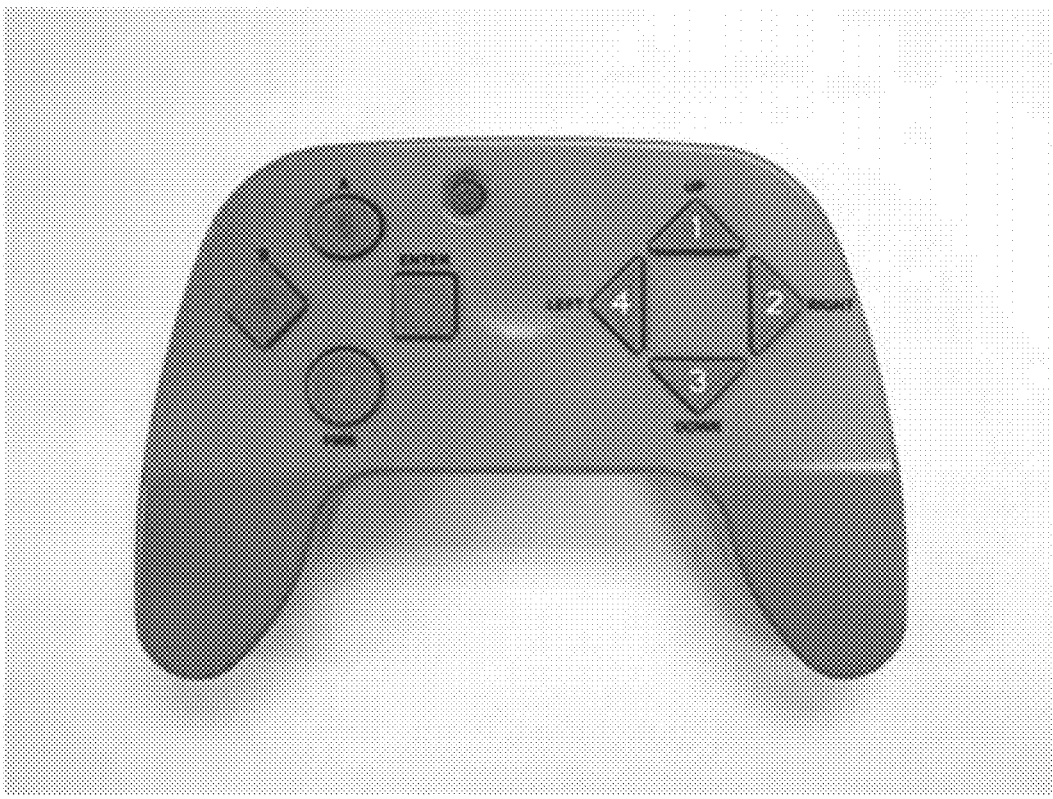
FIG. 26 illustrates a versatile game controller.

Once the game data are generated, the game data and the video clip can be stored and programmed concurrently and/or separately into the memory of the game unit. At the beginning of the game, a game program and image data in the game unit are used to display and generate a sprite image simulating a shooting sight through multiple layers of sprite animation, and the sprite image can be moved at will by the game player through a game controller and is overlaid and played with the video clip, as shown in FIG. 25. The game player may aim at the sprite image by using "up", "down", "left" and "right" commands on the game controller, and chase and sight the gangsters in the video clip. With the game program, the game player may actuate a specific shooting command on the game controller to fire at the gangsters. FIG. 26 illustrates a versatile game controller adapted for the police drama shooting game.

As can be seen, the method of the invention for constructing an interactive video game by use of a frame-recording based video clip utilizes the video clip by analyzing the video clip and the grid layer to generate a series of game data. This does not include any modification to each of the frames of the video clip. Accordingly, there is no need to modify the video clip and/or directly insert any form of signals into the video clip according to the invention.

Correspondingly, the present invention provides an apparatus for processing a frame-recording based video clip, comprising: a video editing module for browsing the video clip frame by frame; input means connected to the video editing module for importing into the video editing module a grid layer which is browsed synchronously with each frame of the video clip, wherein a character and/or an object in the video clip has a corresponding position in the grip layer, and the position of the character and/or the object varies with movement of the character and/or the object in the grid layer; editing means connected to the video editing module for generating a series of data in response to the movement of the character and/or the object from successive frames of the video clip within the grid layer to record and analyze the movement by the grid layer; and a memory connected to the editing means for storing the series of data.

In addition, the present invention provides an apparatus for constructing an interactive video game by use of a frame-recording based video clip, comprising: a video editing module for browsing the video clip frame by frame; input means connected to the video editing module for importing into the video editing module a grid layer which is browsed synchronously with each frame of the video clip, wherein a character and/or an object in the video clip has a corresponding position in the grip layer, and the position of the character and/or the object varies with movement of the character and/or the object in the grid layer; editing means connected to the video editing module for generating a series of game data in response to the movement of the character and/or the object from successive frames of the video clip within the grid layer to record and analyze the movement by the grid layer; a memory connected to the editing means for storing the series of game data; a game input for inputting data indicative of operational movement of a game player; and a game unit connected respectively to the memory and the game input for receiving the input data from the game input when the video clip is played and synchronously comparing the input data with the game data to determine whether they match with each other after the game is activated.

Lastly, the present invention provides an apparatus for constructing an interactive video game by use of a video clip utilizing a grid pattern as a background during filming of the video clip, comprising: editing means for generating a series of game data in response to movement of a character and/or an object in the video clip within the grid layer; a memory connected to the editing means for storing the series of game data in a game unit after the generation of all the game data; a game input for inputting data indicative of operational movement of a game player; and wherein the game unit is connected respectively to the memory and the game input for receiving the input data from the game input when the video clip is played and synchronously comparing the input data with the game data to determine whether they match with each other after the game is activated.

While the embodiments described herein are intended as exemplary methods and apparatuses, it will be appreciated by those skilled in the art that the present invention is not limited to the embodiments illustrated. Those skilled in the art will envision many other possible variations and modifications by means of the skilled person's common knowledge without departing from the scope of the invention, however, such variations and modifications should fall into the scope of this invention.

What is claimed is:

1. A method for processing a frame-recording based video clip on a computer, comprising the steps of:
    browsing the video clip frame by frame by a video editing software executed by a processor of the computer;
    importing, using the processor, a grid layer into the video editing software such that the grid layer is browsed synchronously with each frame of the video clip, wherein a character and/or an object in the video clip has a corresponding position in the grip layer, and the position of the character and/or the object varies with movement of the character and/or the object in the grid layer;
    analyzing, on the computer, the movement of the character and/or the object by the grid layer in response to the variation of the position of the character and/or the object from successive frames of the video clip within the grid layer;
    generating a series of data to record the movement of the character and/or the object; and
    storing the series of data.

2. A method according to claim 1, wherein the grid layer is transparent.

3. A method according to claim 1, wherein the grid layer is divided into a plurality of grids by a plurality of grid lines, each of the grids being assigned with a reference number.

4. A method according to claim 1, wherein the movement of the character and/or the object includes a position or a relative position of the character and/or the object in the successive frames, a direction of the movement of the character or a footstep of the character in the successive frames, or a direction of the movement of the object in the successive frames.

5. A method for constructing an interactive video game by use of a frame-recording based video clip, comprising the steps of:

browsing the video clip frame by frame by a video editing software executed by a processor of a computer;

importing, using the processor, a grid layer into the video editing software such that the grid layer is browsed synchronously with each frame of the video clip, wherein a character and/or an object in the video clip has a corresponding position in the grip layer, and the position of the character and/or the object varies with movement of the character and/or the object in the grid layer;

analyzing, on the computer, the movement of the character and/or the object by the grid layer in response to the variation of the position of the character and/or the object from successive frames of the video clip within the grid layer;

generating a series of game data to record the movement of the character and/or the object;

storing the series of game data in a memory of a game unit after the generation of all the game data, wherein and the memory has a game control program stored therein; and connecting a game input to the game unit to activate the game, the game unit receiving input data from the game input when the video clip is played and synchronously comparing the input data with the game data to determine whether they matches with each other.

6. A method according to claim 5, wherein the grid layer is transparent.

7. A method according to claim 5, wherein the grid layer is divided into a plurality of grids by a plurality of opaque grid lines, each grid being assigned with a reference number.

8. A method according to claim 7, wherein the grid lines are spaced evenly or variably.

9. A method according to claim 5, wherein the movement of the character and/or the object includes a position or a relative position of the character and/or the object in the successive frames, a direction of the movement of the character or a footstep of the character in the successive frames, or a direction of the movement of the object in the successive frames.

10. A method according to claim 5, wherein the game input is a dance mat, and the game unit compares the input data from the dance mat with the game data to determine whether a game player follows correctly steps of the character in the video clip, and then provide a feedback.

11. A method according to claim 10, wherein the game unit further provides a score layer to show a score indicative of how well the game player follow correctly the steps of the character in the video clip.

12. A method for constructing an interactive video game by use of a video clip, comprising the steps of:

providing, a grid pattern as a background during filming of the video clip;

browsing the video clip frame by frame by a video editing software executed by a processor of a computer after the filming, recording movement of a character and/or an object in the video clip within the grid pattern on the computer, and generating a series of game data;

storing the video clip and the series of game data in a memory of a game unit after the generation of all the game data, wherein the memory has a game control program stored therein; and connecting a game input to the game unit to activate the game, the game unit receiving input data from the game input when the video clip is played and synchronously comparing the input data with the game data to determine whether they match with each other.

13. An apparatus for processing a frame-recording based video clip, comprising:

a video editing module for browsing the video clip frame by frame;

input means connected to the video editing module for importing into the video editing module a grid layer which is browsed synchronously with each frame of the video clip, wherein a character and/or an object in the video clip has a corresponding position in the grip layer, and the position of the character and/or the object varies with movement of the character and/or the object within the grid layer;

editing means connected to the video editing module for generating a series of data in response to the movement of the character and/or the object from successive frames of the video clip within the grid layer to record and analyze the movement by the grid layer; and a memory connected to the editing means for storing the series of data.

14. An apparatus for constructing an interactive video game by use of a frame-recording based video clip, comprising:

a video editing module for browsing the video clip frame by frame;

input means connected to the video editing module for importing into the video editing module a grid layer which is browsed synchronously with each frame of the video clip, wherein a character and/or an object in the video clip has a corresponding position in the grip layer, and the position of the character and/or the object varies with movement of the character and/or the object within the grid layer;

editing means connected to the video editing module for generating a series of game data in response to the movement of the character and/or the object from successive frames of the video clip within the grid layer to record and analyze the movement by the grid layer;

a memory connected to the editing means for storing the series of game data;

a game input for inputting data indicative of operational movement of a game player; and a game unit connected respectively to the memory and the game input for receiving the input data from the game input when the video clip is played and synchronously comparing the input data with the game data to determine whether they match with each other after the game is activated.

15. An apparatus according to claim 14, wherein the game input is a dance mat, and the game unit compares the input data from the dance mat with the game data to determine whether a game player follows correctly steps of the character in the video clip, and then provide a feedback.

16. An apparatus according to claim 15, wherein the game unit further provides a score layer to show a score indicative of how well the game player follow correctly the steps of the character in the video clip.

17. An apparatus for constructing an interactive video game by use of a video clip utilizing a grid pattern as a background during filming of the video clip, comprising:

a video editing module for browsing the video clip frame by frame;

editing means connected to the video editing module for generating a series of game data in response to movement of a character or an object from successive frames of the video clip within a grid layer to record and analyze the movement by the grid layer;

a memory connected to the editing means for storing the series of game data in a game unit after the generation of all the game data; and a game input for inputting data indicative of operational movement of a game player, wherein the game unit is connected respectively to the memory and the game input for receiving the input data from the game input when the video clip is played and synchronously comparing the input data with the game data to determine whether they match with each other after the game is activated.

* * * * *